US011176832B2

(12) United States Patent
Mohan et al.

(10) Patent No.: US 11,176,832 B2
(45) Date of Patent: Nov. 16, 2021

(54) SYSTEMS AND METHODS TO INTEGRATE REAL-TIME INTERNET-CONNECTED AIRCRAFT DATA FOR CARGO PLANNING

(71) Applicant: Honeywell International Inc., Morris Plains, NJ (US)

(72) Inventors: Rajeev Mohan, Arakere (IN); Narayanan Srinivasan, Morris Plains, NJ (US); Kirupakar Janakiraman, Madurai (IN); Ramkumar Rajendran, Theni District (IN)

(73) Assignee: Honeywell International Inc., Charlotte, NC (US)

( * ) Notice: Subject to any disclaimer, the term of this patent is extended or adjusted under 35 U.S.C. 154(b) by 259 days.

(21) Appl. No.: 16/394,361

(22) Filed: Apr. 25, 2019

(65) Prior Publication Data

US 2020/0342771 A1 Oct. 29, 2020

(51) Int. Cl.
*G08G 5/00* (2006.01)
*G07C 5/00* (2006.01)
*G06Q 10/08* (2012.01)

(52) U.S. Cl.
CPC ........... *G08G 5/0039* (2013.01); *G07C 5/008* (2013.01); *G08G 5/0013* (2013.01)

(58) Field of Classification Search
USPC ....................................................... 701/120
See application file for complete search history.

(56) References Cited

U.S. PATENT DOCUMENTS

| 3,722,716 | A | 3/1973 | Tantlinger |
| 4,312,619 | A | 1/1982 | Anderson |
| 7,343,995 | B2 | 3/2008 | Fukuhara et al. |
| 7,471,995 | B1* | 12/2008 | Robinson ............... G01C 23/00 340/901 |
| 8,509,968 | B1 | 8/2013 | Saccone et al. |
| 9,117,366 | B1* | 8/2015 | Seah .................... G08G 5/0082 |
| 9,824,593 | B1 | 11/2017 | Kronfeld et al. |
| 10,532,823 | B1* | 1/2020 | Barber ................. G08G 5/0034 |
| 2009/0105943 | A1* | 4/2009 | Ferro ................... G08G 5/0034 701/533 |
| 2010/0100225 | A1 | 4/2010 | Reed et al. |
| 2010/0213313 | A1 | 8/2010 | Reed et al. |
| 2013/0204469 | A1 | 8/2013 | Horsager et al. |
| 2013/0210405 | A1* | 8/2013 | Whipple ............... H04W 4/027 455/418 |

(Continued)

FOREIGN PATENT DOCUMENTS

DE 102008052468 A1 5/2009
DE 102010006479 A1 5/2012

(Continued)

*Primary Examiner* — Tyler D Paige
(74) *Attorney, Agent, or Firm* — Bookoff McAndrews, PLLC

(57) ABSTRACT

Disclosed are systems, methods, and non-transitory computer-readable medium for fleet based aircraft flight planning using real-time intelligence. For example, a system may include a simulation engine configured to calculate flight modification parameters associated with an aircraft based on real-time flight data of the aircraft, real-time weather data along a flight path of the aircraft, and real-time planning data of the aircraft, and then transmit the flight modification parameters to a flight management system (FMS) of the aircraft.

17 Claims, 7 Drawing Sheets

(56) References Cited

U.S. PATENT DOCUMENTS

| | | | |
|---|---|---|---|
| 2013/0226373 A1 | 8/2013 | Bollapragada et al. | |
| 2015/0254604 A1* | 9/2015 | Arora | B64D 9/00 705/332 |
| 2020/0010071 A1* | 1/2020 | Brancato | G06Q 50/28 |
| 2020/0342771 A1* | 10/2020 | Mohan | G08G 5/0013 |

FOREIGN PATENT DOCUMENTS

| | | |
|---|---|---|
| EP | 1953086 A1 | 8/2008 |
| EP | 3007153 A2 | 4/2016 |
| EP | 3154047 A | 4/2017 |
| EP | 3315407 A1 | 5/2018 |
| EP | 3471080 A1 | 4/2019 |
| FR | 2935184 A1 | 2/2010 |
| JP | 105185995 A | 7/1993 |
| JP | 2002029631 A | 1/2002 |

* cited by examiner

SYSTEMS AND METHODS TO INTEGRATE REAL-TIME INTERNET-CONNECTED AIRCRAFT DATA FOR CARGO PLANNING

TECHNICAL FIELD

Various embodiments of the present disclosure generally relate to a connected service-oriented architecture of flight management system (FMS) services, and more particularly, to integrate Connected FMS Software as a Service (SaaS) solution with existing information technology (IT) infrastructures to effectively plan a cargo flight.

BACKGROUND

Large air-cargo operators are constrained by the limited time available to optimally plan and load air cargo. These operators have hundreds of aircrafts operating out of hub-and-spoke network airports where consignments are loaded onto or unloaded from aircrafts to be dispatched to their final destination. However, up until now cargo flight planning have used ground based simulation and modelling systems utilizing historical, predicted data for the calculations. Large air-cargo operators are faced with challenges such as lack of sufficient time for adequate load planning and execution, and lack of accurate information about dynamic parameters of en route aircrafts. The present disclosure is directed to overcoming one or more of these issues.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF DISCLOSURE

According to certain aspects of the disclosure, systems and methods are disclosed to provide aircraft cargo planning using real-time aircraft intelligence through a Connected-FMS services as a Software as a Service (Saas) platform.

In one embodiment, a computer-implemented method is disclosed for fleet based aircraft flight planning using real-time aircraft intelligence. The computer-implemented method may comprise: receiving, by a processor, real-time flight data associated with at least one flight parameters of an aircraft; receiving, by the processor, real-time weather data along a flight path of the aircraft; receiving, by the processor, real-time planning data of the aircraft; calculating, by a simulation engine executed by the processor, flight modification parameters using the real-time flight data of the aircraft, the real-time weather data, and the real-time planning data; and transmitting, by the processor, the flight modification parameters to a flight management system (FMS) of the aircraft, wherein the at least one flight parameters of the aircraft is adjusted based on the flight modification parameters.

In accordance with another embodiment, a computer-implemented system is disclosed for fleet based aircraft flight planning using real-time aircraft intelligence. The computer-implemented system may comprise: a memory having processor-readable instructions stored therein; and at least one processor configured to access the memory and execute the processor-readable instructions, which when executed by the at least one processor configures the processor to perform: receiving real-time flight data associated with at least one flight parameters of an aircraft; receiving real-time weather data along a flight path of the aircraft; receiving real-time planning data of the aircraft; calculating flight modification parameters using the real-time flight data of the aircraft, the real-time weather data, and the real-time planning data; and transmitting the flight modification parameters to a flight management system (FMS) of the aircraft, wherein the at least one flight parameters of the aircraft is adjusted based on the flight modification parameters.

In accordance with another embodiment, a non-transitory computer-readable medium is disclosed for fleet based aircraft flight planning using real-time aircraft intelligence. The non-transitory computer readable medium may comprise instructions for: receiving, by a processor, real-time flight data associated with at least one flight parameters of an aircraft; receiving, by the processor, real-time weather data along a flight path of the aircraft; receiving, by the processor, real-time planning data of the aircraft; calculating flight modification parameters using the real-time flight data of the aircraft, the real-time weather data, and the real-time planning data; and transmitting, by a processor, the flight modification parameters to a flight management system (FMS) of the aircraft, wherein the at least one flight parameters of the aircraft is adjusted based on the flight modification parameters.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
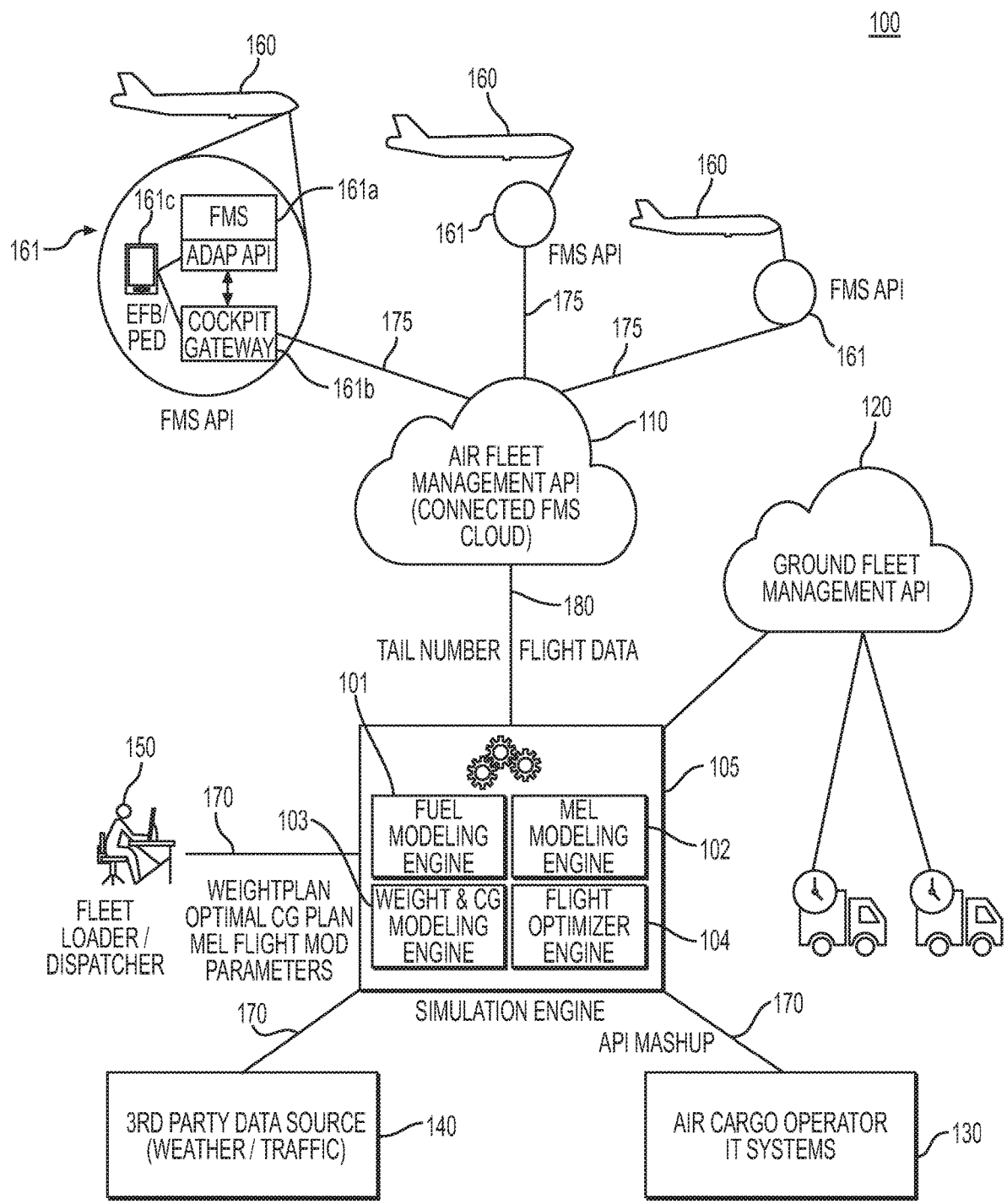
FIG. 1 depicts an overview of an exemplary environment in which systems, methods, and other aspects of the present disclosure may be implemented.

As described above, there has been consistent growth in air-traffic over the past several years. Large air-cargo operators are constrained by the limited time available to optimally plan and load air cargo. These operators have hundreds of aircrafts operating out of hub-and-spoke network airports where consignments are loaded onto or unloaded from aircrafts to be dispatched to their final destination.

Conventional cargo flight planning techniques may only involve ground based simulation and modelling systems utilizing historical, predicted data for the calculations.

Some of the challenges faced by the air-freight industry currently include lack of time for adequate load planning and execution, and lack of accurate information about dynamic parameters of en-route aircrafts. Weight and balance of the cargo also are important factors in aircraft load planning as the weight and balance need to be calculated for each flight leg individually. Cargo flights often contain multiple legs and, after each leg, certain unit load devices (ULDs) might be loaded or unloaded while others continue onto the next flight leg. Rearranging the continuing ULDs between two flight legs might save fuel or allow the aircraft to load more weight. Inefficient center of gravity (CG) at takeoff due to sub-optimal placement of cargo containers in the cargo holds lead to increased fuel usage in subsequent legs of the flight. Thus, a need exists to implement a novel simulation engine that uses the power of connected APIs to get dynamic aircraft parameters in real time from each aircraft, and feed them to fleet aircraft operators so they can accurately and predictably plan cargo flights.

Accordingly, the following embodiments describe systems and methods for providing one or more fleet aircraft operators with access to dynamic parameters of en-route aircrafts. According to certain aspects of the present disclosure, real-time parameters may be received from aircrafts and the received parameters may be input into a simulation engine to optimally plan cargo load, cargo placement within the cargo hold, optimal center of gravity, and any other flight parameter adjustments. As described in further detail below, providing dynamic aircraft parameters in real time from any one of a plurality of aircrafts may result in improvement in refining cargo planning in various aspects. By allowing fleet aircraft operators to access dynamic parameters, the operators may be able to plan cargo more efficiently by utilizing data that is current, accurate, and predictable.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an overview of an exemplary environment 100 according to one or more embodiments of the present disclosure. The environment 100 may, for example, include a plurality of aircrafts 160, a connected FMS Cloud services platform 110, a Ground Fleet Management services platform 120, Air Cargo Operator IT systems 130, third party data sources 140, a Fleet Loader/Dispatcher 150, and a simulation engine 105. The connected FMS cloud services platform 110 may be a cloud-based platform that provides FMS services to any user who has authorized access to the platform, as described in further detail below.

As shown in FIG. 1, each of the aircrafts 160 may also include an FMS API (flight management system application programming interface) 161 which may be comprised of an onboard FMS 161*a*, a cockpit gateway 161*b*, and an EFB/PED (electronic flight bag/personal electronic device) 161*c*. Onboard FMS 161*a* may be any specialized computer system physically installed in an aircraft (e.g., the cockpit), and may be programmed and/or customized to service the flight crew of the aircraft with in-flight tasks. A cockpit gateway 161*b* may be a device that integrates all sources of data (e.g., flight operation data, maintenance data) on an aircraft and sends the data to the appropriate operators of the aircraft at time intervals specified by the operators. As an example, the cockpit gateway 161*b* may host several services which enable the connectivity between the ground system and the FMS 161*a*. The services may be to query the onboard fuel quantity of an aircraft, to query the onboard weight of the aircraft, to query the predicted fuel level of the aircraft at landing, to query the predicted weight of the aircraft at landing, to query the fuel flow between the left and right fuel tanks of the aircraft, and to query the change in the center of gravity (CG) of the aircraft. An EFB/PED 161*c* may be a computer device carried by a pilot of a flight crew, which may store, for example, navigational charts, maps for air and ground operations of an aircraft, a flight plan management system, an aircraft operating manual, a flight-crew operating manual, software applications which automate flight-related or avionics-related computation tasks, and/or any application or data which may be installed in a computing platform. Each of the plurality of aircraft FMS API 161 may communicate with the air fleet management API of the connected FMS Cloud services platform 110 via communication link 175.

The onboard FMS 161*a*, the cockpit gateway 161*b*, and the EFB/PED 161*c* may include one or more devices capable of receiving, generating, storing, processing, and/or providing information associated with FMS services. For example, the onboard FMS 161*a*, the cockpit gateway 161*b*, or the EFB/PED 161*c* may include a communication and/or computing device, such as a mobile phone (e.g., a smart phone, a radiotelephone, etc.), a computer (e.g., a desktop computer, a laptop computer, a tablet computer, a handheld computer), a gaming device, a wearable communication device (e.g., a smart wristwatch, a pair of smart eyeglasses, etc.), or a similar type of device. The onboard FMS 161*a*, the cockpit gateway 161*b*, and the EFB/PED 161*c* may be in communication with one another via wired or wireless connections, or any other suitable means of communication protocol.

As further shown in FIG. 1, the simulation engine 105 may be comprised of the fuel modeling engine 101, the minimum equipment list (MEL) modeling engine 102, the weight and center of gravity (CG) modeling engine 103, and the flight optimizer engine 104. The simulation engine 105 may be in communication with the connected FMS Cloud services platform 110, the Ground Fleet Management services platform 120, the Air Cargo Operator IT systems 130, the third party data sources 140, and Fleet Loader/Dispatcher 150 via the API MASHUP communication link 170. The simulation engine 105 may be built in to the connected FMS Cloud services platform 110, or may be implemented separately but connected to the connected FMS Cloud services platform 110 via an air fleet management API communications link 180.

In one embodiment, the operation of the simulation engine 105 in the environment 100 may be follows. Aircraft 160 may communicate information such as the tail number of the aircraft and flight data to the connected FMS Cloud services platform 110 via the aircraft FMS API 161 using communication link 175. Communication link 175 may be digital communication mechanism or any existing data-link or radio mechanism. Flight data from the aircraft may include the predicted fuel available in the aircraft when it lands, the predicted weight of the aircraft when it lands, any jettison or anomalous fuel quantity which would affect the predicted fuel level and the weight of the aircraft, the fuel flow data between the left and right pumps as desired by the crew, the predicted estimated time of arrival (ETA) of the aircraft at a stopover airport, any unplanned diversion from original flight path by the crew due to weather, traffic or other issues, and any minimum equipment list (MEL) constraints developed by the en-route aircraft. The flight data may be transmitted automatically by the aircraft FMS API 161 without aircraft crew intervention, or it may be transmitted by request from the aircraft crew. In the embodiment where the simulation engine 105 is built in to the connected FMS Cloud services platform 110, the flight data may be transmitted directly to the simulation engine 105. In the embodiment where the simulation engine 105 is separate from the connect FMS Cloud services platform 110, the flight data may be transmitted to the simulation engine 105 via the air fleet management API communications link 180.

The simulation engine 105 may also receive planning data from Ground Fleet Management services platform 120, the Air Cargo Operator IT system 130, the third party data sources 140, and Fleet Loader/Dispatcher 150. The simulation engine 105 may then perform simulations based on all the data received using one or more of the fuel modeling engine 101, the MEL modeling engine 102, the Weight and CG modeling engine 103, and the flight optimizer engine 104. As an example, the fuel modeling engine 101 using all of the received data may predict the fuel at landing at the next destination based on the current fuel consumption, flight path deviations due to traffic or weather, holding and taxing time at the destination. The model may also include the flight performance degradation due to mechanical failures to predict fuel that would be available when the aircraft lands. As another example, the weight and CG modeling engine 103 using all of the received data may simulate different placements of cargo within the cargo hold and the resultant impact on fuel weight and fuel usage. This simulation would change dynamically due to fuel burn along the flight. Therefore this simulation may be performed once for the whole flight path or multiple times during the flight path, depending on the requirements of the fleet operator. As another example, the MEL modeling engine 102 using all of the received data may predict any minimum equipment level constraints developed by the en-route aircraft. For example, one or more pieces of equipment may fail during the flight, and the MEL modeling engine 102 may perform simulations based on operational states of the equipment. In another example, the flight optimizer engine 104 using all of the received data may perform simulations to optimize flight. The result of the optimized flight could be in the form of speed or time constraints. The simulation may decide if the aircraft needs to speed up to meet time constraints or slow down and save fuel while accounting for ground cargo handling needs (e.g. shipment arrival delay, departing flight delay, high cost of missing cargo deadlines like overnight shipping, etc.). If the simulation results in any modification in flight parameters, then a notification maybe sent to the aircraft crew via communication link 175 to the FMS API 161 to make appropriate changes to the flight parameters.

As indicated above, FIG. 1 is provided merely as an example. Other examples are possible and may differ from what was described with regard to FIG. 1. The number and arrangement of devices and networks shown in FIG. 1 are provided as an example. In practice, there may be additional devices, fewer devices and/or networks, different devices and/or networks, or differently arranged devices and/or networks than those shown in FIG. 1. Furthermore, two or more devices shown in FIG. 1 (e.g., EFB/PED 161*c* and cockpit gateway 161*b*) may be implemented within a single device, or a single device shown in FIG. 1 (e.g., EFB/PED 161*c*, onboard FMS 161*a*, cockpit gateway 161*b*) may be implemented as multiple, distributed devices. Additionally, or alternatively, a set of devices (e.g., one or more devices) of environment 100 may perform one or more functions described as being performed by another set of devices of environment 100.

Figure 2A:
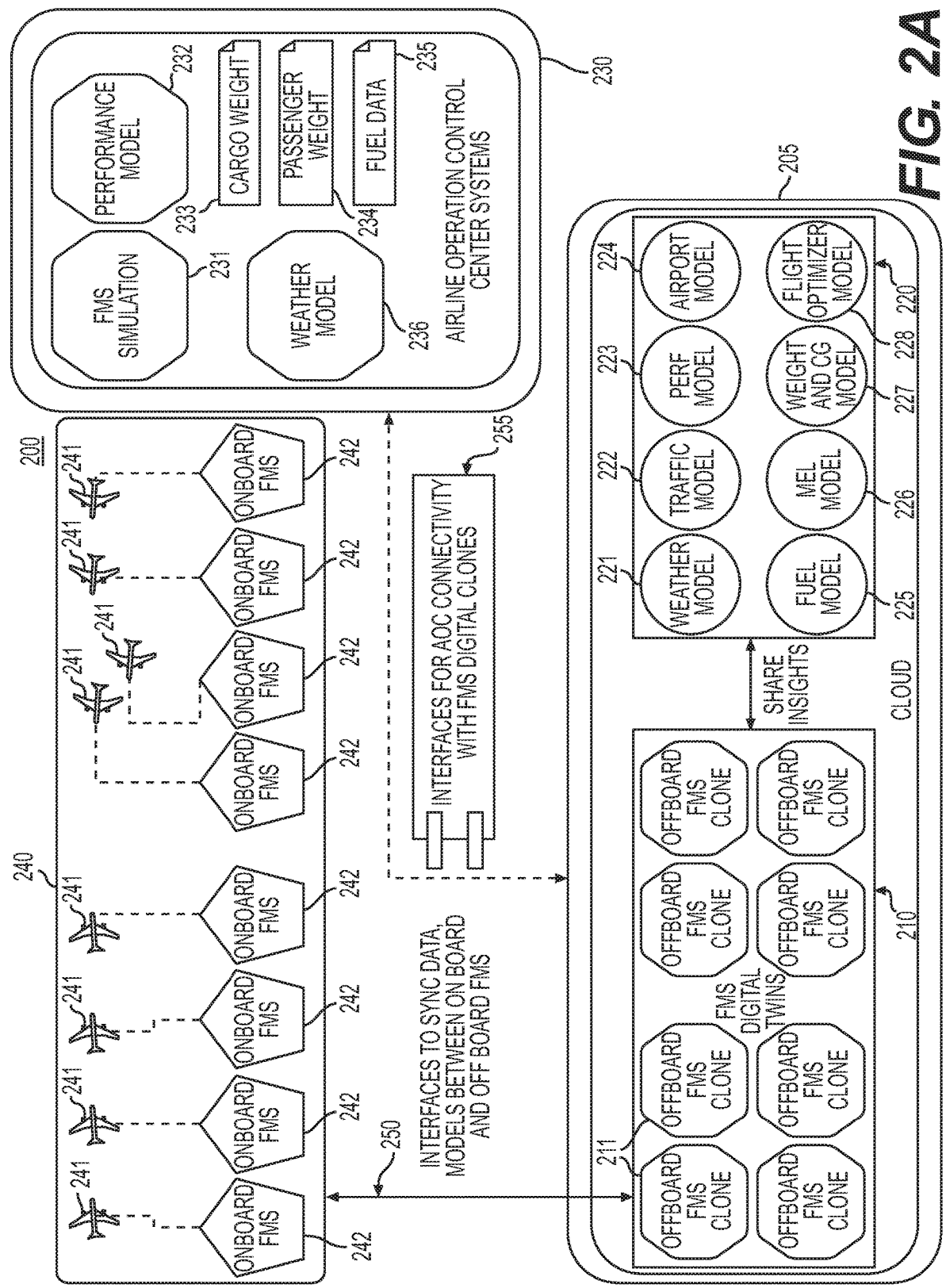
FIG. 2A depicts a closed up overview of an exemplary environment of interconnections between the Connected FMS Cargo and Fuel Services system with aircraft onboard FMS and Airline Operation Control (AOC) Center systems, according to one aspect of the present disclosure.

FIG. 2A depicts a closed up overview of an exemplary environment of interconnections between the Connected FMS Cargo and Fuel Services system with aircraft onboard FMS and Airline Operation Control (AOC) Center Systems, according to one aspect of the present disclosure. As shown in FIG. 2A, environment 200 may include a cloud 205, airline operation control (AOC) center systems 230, and aircraft operators 240. The cloud 205 interfaces with the aircraft operators 240 via the communication channel 250.

The cloud 205 interfaces with the AOC center system 230 via the communication channel 255.

The cloud 205 may be comprised of FMS digital twins 210 and a simulation engine 220. The FMS digital twins 210 may include a plurality of off board FMS clones 211. The simulation engine 220 may comprise a weather model 221, a traffic model 222, a performance model 223, an airport model 224, a fuel model 225, a Minimum Equipment List (MEL) model 226, a weight and CG model 227, and a flight optimizer model 228. Furthermore, the AOC center systems 230 may comprise an FMS simulation model 231, a performance model 232, a weather model 236, a cargo weight database 233, a passenger weight database 234, and a fuel data database 235. The aircraft operators 240 may comprise a plurality of aircrafts 241, and each aircraft 241 may contain an onboard FMS 242.

In some implementations, the cloud 205 may correspond to the connected FMS cloud services platform 110 and simulation engine 105 depicted in FIG. 1. In some implementations, the simulation engine 220 may correspond to the simulation engine 105 depicted in FIG. 1. In the embodiment shown in FIG. 2, the simulation engine 220 is built into cloud 205, and the simulation engine 220 may include other simulation models than those depicted in FIG. 1.

As further shown in FIG. 2A, an exemplary operation of environment 200 will be discussed herein. The AOC center systems 230 may contain data relevant to cargo planning, for example data related to cargo weight, passenger weight, and fuel data. As depicted in FIG. 2A, the AOC center systems 230 may perform its own simulation using the FMS simulation 231, performance model 232, and weather model 236. However in other embodiments, the AOC center systems 230 may not have the simulation models and rely solely on the simulation engine 220. AOC center systems 230 may then transmit the cargo planning data to the cloud 205 via communication channel 255. At cloud 205, the cargo planning data may be entered into the simulation model 220 to perform one or more simulations using the weather model 221, traffic model 222, performance model 223, airport model 224, fuel model 225, MEL model 226, weight and CG model 227, and flight optimizer model 228. In one embodiment, once the simulations are complete, any modification in flight parameters may be sent to the one or more off-board FMS clones 211. The one or more off-board FMS clones 211 may then synchronize the modification in flight parameters via communication channel 250 with the onboard FMS 242 of an en-route aircraft 241. In another embodiment, once the simulations are complete, any modification in flight parameters may be sent to the onboard FMS 242 of an en-route aircraft 241 via communications channel 250, bypassing the one or more off-board FMS clones 211.

The number and arrangement of modules, devices, and networks shown in FIG. 2A are provided as an example. In practice, there may be additional modules and devices, fewer modules, devices and/or networks, different modules, devices and/or networks, or differently arranged modules, devices and/or networks than those shown in FIG. 2A. Furthermore, two or more devices included in environment 200 of FIG. 2A may be implemented within a single device, or a single device in the environment 200 of FIG. 2A may be implemented as multiple, distributed devices. Additionally, or alternatively, a set of devices (e.g., one or more devices) of environment 200 may perform one or more functions described as being performed by another set of devices of environment 200.

Figure 2B:
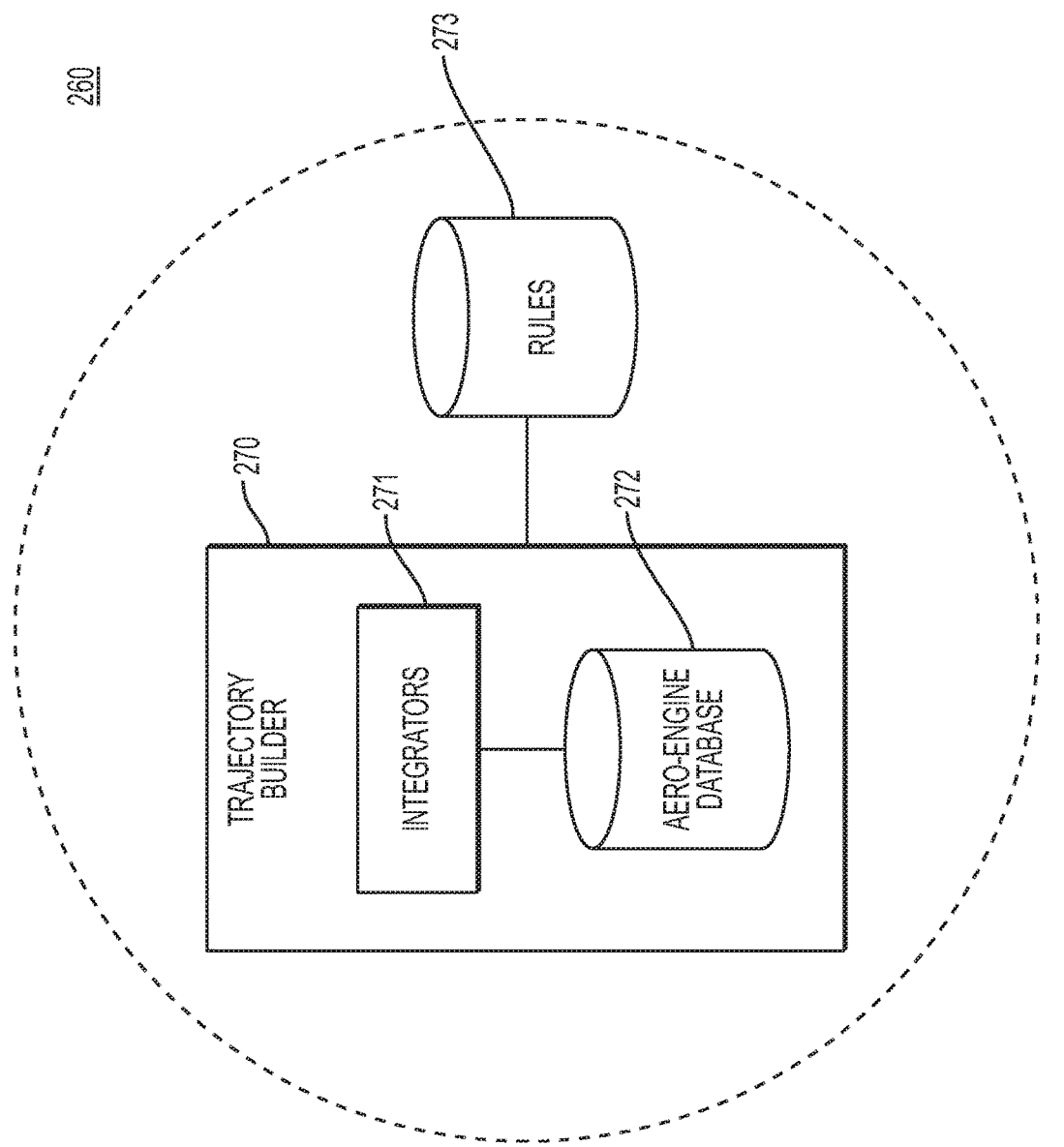
FIG. 2B depicts an exemplary component diagram comprising various components utilized by one of a plurality of modeling engines, according to one aspect of the present disclosure.

FIG. 2B depicts an exemplary component diagram comprising various components utilized by any one of a plurality of modeling engines disclosed in FIG. 1 and FIG. 2A. The component diagram 260 may include a trajectory builder 270, integrators 271, an aero engine database 272, and a rules database 273.

The functions of the components in the diagram 260 will discussed herein with respect to the modeling engines as depicted in FIG. 1 and FIG. 2A. For example the fuel modeling engine 101, MEL modeling engine 102, weight and CG modeling engine 103, flight optimizer engine 104, the fuel model 225, MEL model 226, weight and CG model 227, and flight optimizer model 228 may all incorporate the components of diagram 260 to perform the respective simulations.

The MEL modeling engine 102 may receive a minimum equipment list (MEL) for an aircraft and then convert the list into rules that are added to the rules database 273. The trajectory builder 270 may utilize the rules in the rules database 273 as constraints and generate a trajectory of the aircraft. For example, the MEL list may include the following condition: inactive icing pack, operable altitude restricted to 25000 feet. Based on this condition, the MEL modeling engine 102 may create a rule that states: activate altitude constraint rule with value <=25000 with the applicability to all flight phases. The trajectory builder 270, while generating a trajectory, may check the rule database 273 and see the activate altitude constraint rule with a value of <=25000 feet and may not generate a vertical profile that exceeds the altitude of 25000 feet.

The fuel modeling engine 102, weight and CG modeling engine 103, and flight optimizer engine 104 may all use aircraft state data supplied by the onboard FMS 161a of the aircraft 160. The component that computes data required for fuel model, weight and CG model, and flight optimization may be the integrators 271. The integrators 271 may be used to advance aircraft state along a lateral flight plan to compute the vertical profile. Integrators 271 may use the aero engine database 272 provided by aircraft manufactures to compute parameters like aircraft drag, fuel flow, thrust setting parameters (TSP) and optimum speeds. The integrators 271 may use the equations of motion for an aircraft with the assumption that said aircraft is a point mass. Integrators 271 may set the data defining aircraft performance for the start point of the integration segment (point A), then evaluate aircraft's equation of motion to advance predicted aircraft state to the end point (point B) of the integration segment. The data that is used (i.e., input) for this computation may include, altitude, distance to destination, flight phase, ground speed, gross weight, temperature deviation, true air speed, and time in seconds. The data that is computed based on the input data may include mach speed, temperature ratio, pressure ratio, acceleration, flight path angle, drag, fuel flow, engine thrust, vertical speed, and integration segment length, etc. Elapsed time for a segment may be calculated by ground speed, and distance may be used to calculate time taken for a segment. Fuel flow may be computed by referencing aircraft manufacturer provided aero engine database 272 with input parameters such as pressure altitude, mach number, calibrated airspeed, temperature and pressure ratio. Once fuel flow is calculated, the calculated fuel flow may be used to compute the gross weight of the aircraft at point B.

The flight optimizer engine 104 may use the trajectory builder 270 to determine fuel usage at each candidate altitude in cruise phase. The trajectory builder 270 may use wind information at each candidate altitude to get accurate fuel data. The candidate altitude with least fuel usage may be provided as a recommended altitude for fuel savings. The weight and CG modeling engine 103 may use a standard model to calculate the center of gravity of the aircraft. Inputs for the calculation may be received from the onboard FMS 161*a* and may include at least the amount of fuel left in each tank, leading to accurate center of gravity computation based on the payload and how it is distributed in the cargo load area.

The operations of the component diagram 260 and the fuel modeling engine 101, MEL modeling engine 102, weight and CG modeling engine 103, and flight optimizer engine 104 described above are examples and not to be construed as limiting. The component diagram 260 may include more components or less components, or components arranged in a different sequence. The various modeling engines may utilize the component diagram 260 as described or may be programmed to utilize different components or functions.

Figure 3:
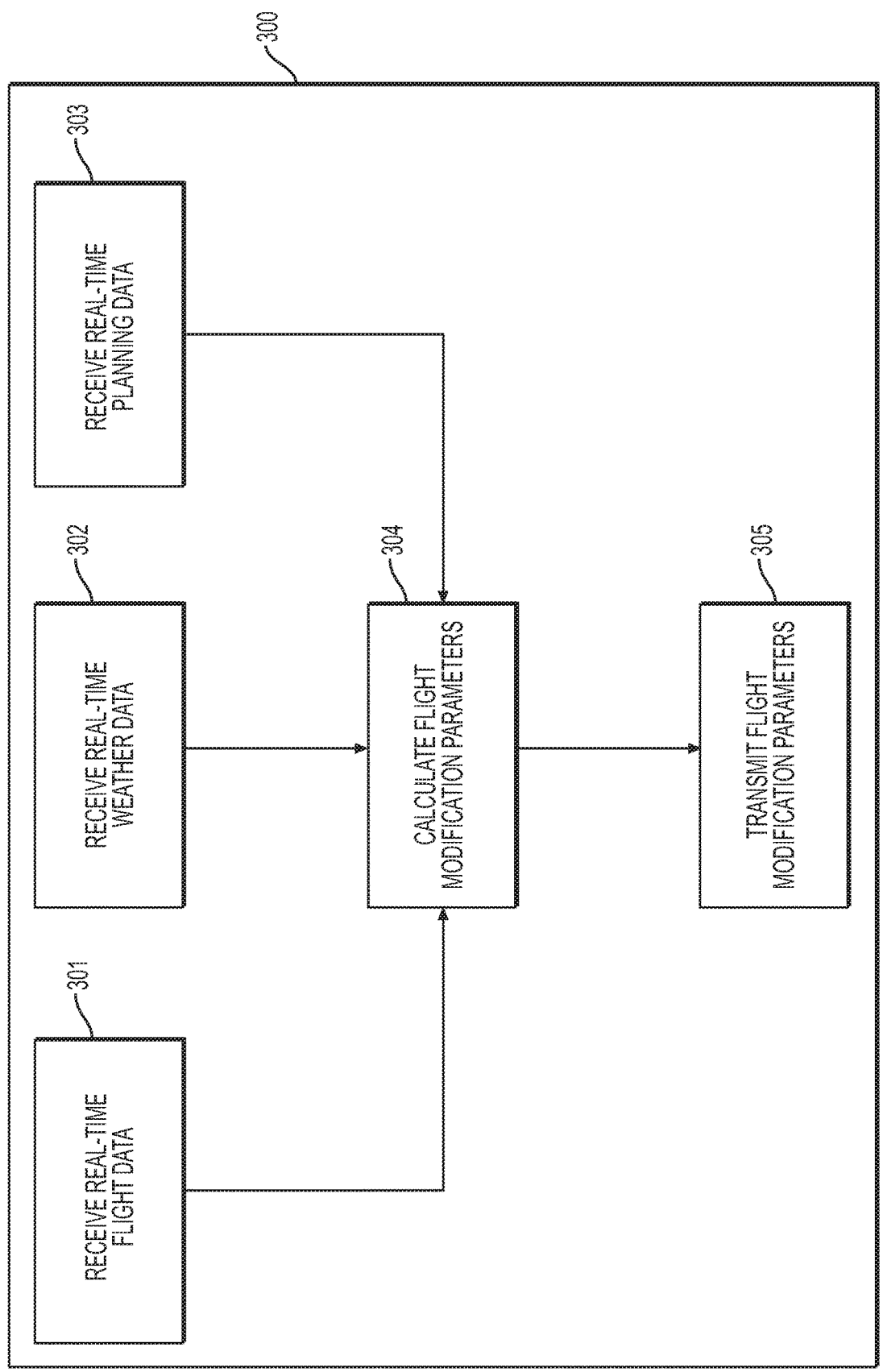
FIG. 3 depicts a flowchart of an exemplary method for providing real-time aircraft intelligence for cargo planning, according to one aspect of the present disclosure.

FIG. 3 depicts a flowchart of an exemplary method 300 for integrating real-time aircraft intelligence for cargo planning.

First, the exemplary method 300 may begin with receiving, using the FMS API 161 onboard aircraft 160, real-time flight data (Step 301). The real-time flight data may comprise at least one of the predicted fuel available in the aircraft when the aircraft lands, the predicted weight of the aircraft when the aircraft lands, any jettison or anomalous fuel quantity which would affect the predicted fuel level and the weight of the aircraft, the fuel flow data between the left and right pumps as desired by the crew, the predicted estimated time of arrival (ETA) of the aircraft at a stopover airport, any unplanned diversion from original flight path by the crew due to weather, traffic or other issues, and any minimum equipment list (MEL) constraints developed by the en-route aircraft.

The exemplary method 300 of FIG. 3 may then receive, from the third party data sources 140, real-time weather and/or traffic data for the flight path of the aircraft (step 302). Furthermore, real-time planning data may be received from at least one of Ground Fleet Management services platform 120, the Air Cargo Operator IT systems 130, and Fleet Loader/Dispatcher 150 (step 303). The data received in steps 301, 302, and 303 may then be input into the simulation engine 105 to calculate any flight modification parameters (step 304). Once the simulation is completed, then the exemplary method 300 may proceed to step 305 where any flight modification parameters may be transmitted to the aircraft crew via communication link 175 to the FMS API 161 where appropriate flight changes may be made to the en-route aircraft 160.

Although FIG. 3 shows exemplary blocks, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
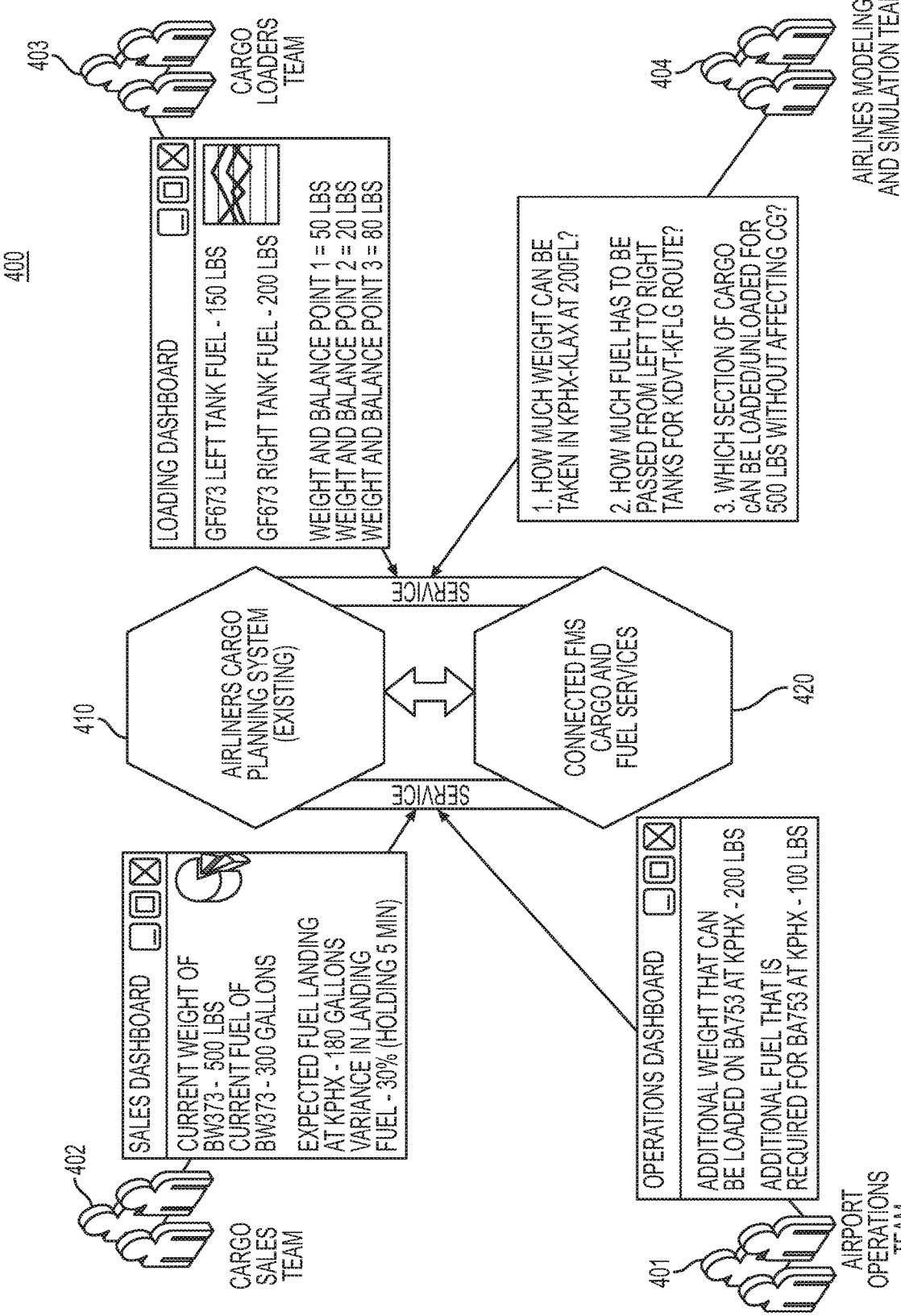
FIG. 4 depicts an exemplary environment illustrating the operation of a cargo planning system by a fleet aircraft operator, according to one aspect of the present disclosure.

FIG. 4 depicts an environment 400 that displays an exemplary operation of the cargo planning system by the fleet aircraft operator.

In one embodiment, environment 400 may include an airport operations team 401, a cargo sales team 402, a cargo loaders team 403, an airline modeling and simulation team 404, an airline cargo planning system 410, and a connected FMS cargo and fuel services 420. In some implementations, the connected FMS cargo and fuel services 420 may correspond to the Connected FMS cloud services platform 110 and simulation engine 105 depicted in FIG. 1. In other implementations, the connected FMS cargo and fuel services 420 may correspond to the cloud 205 depicted in FIG. 2.

In the exemplary environment 400, the fleet aircraft operator may have various teams examine different data for different aircrafts in the fleet. For example, the airport operations team 401 may be able to view via the operations dashboard that 200 pounds of additional weight and 100 pounds of additional fuel are required to be loaded on flight BA753 at Phoenix Sky Harbor international Airport (KPHX). The cargo sales team 402 may able to view via the sales dashboard that the current weight of cargo for flight BW373 is 500 pounds and current fuel for flight BW373 is 300 gallons. When the flight is expected to land at KPHX, the aircraft is expected to have 180 gallons of fuel left with a 30% of variance in landing fuel. The cargo loaders team 403 may be able to view, via the loading dashboard that for flight GF673, there are 150 pounds of fuel in the left fuel tank and 200 pounds of fuel in the right fuel tank. The weight and balance at three points throughout the aircraft is 50 pounds, 20 pounds, and 80 pounds respectively. The data obtained by the airport operations team 401, the cargo sales team 402, and the cargo loaders team 403, may be submitted to the connected FMS cargo and fuel services 420, thereby enabling the airlines modeling and simulation team 404 to perform simulations to more efficiently plan cargo loading. For example, the following simulations can be performed by the airline modeling and simulation team 404: (1). determine how much weight can be taken in Phoenix to Los Angeles (KLAX) flight route at flight level 200; (2). determine how much fuel has to be passed from left to right tanks for the KDVT to KFLG flight route; and (3). which section of cargo can be loaded or unloaded for 500 pounds without affecting the center of gravity of the aircraft. Once the simulations are completed, any flight modification parameters may then be transmitted to the airline cargo planning system 410 for the fleet aircraft operators.

Although FIG. 4 shows examples of fleet aircraft operator teams and the data and simulations available to the teams, in some implementations, environment 400 may have additional fleet aircraft operator teams, fewer fleet aircraft operator teams, different fleet aircraft operator teams, additional data and simulations, fewer data and simulations, or different data and simulations.

Figure 5:
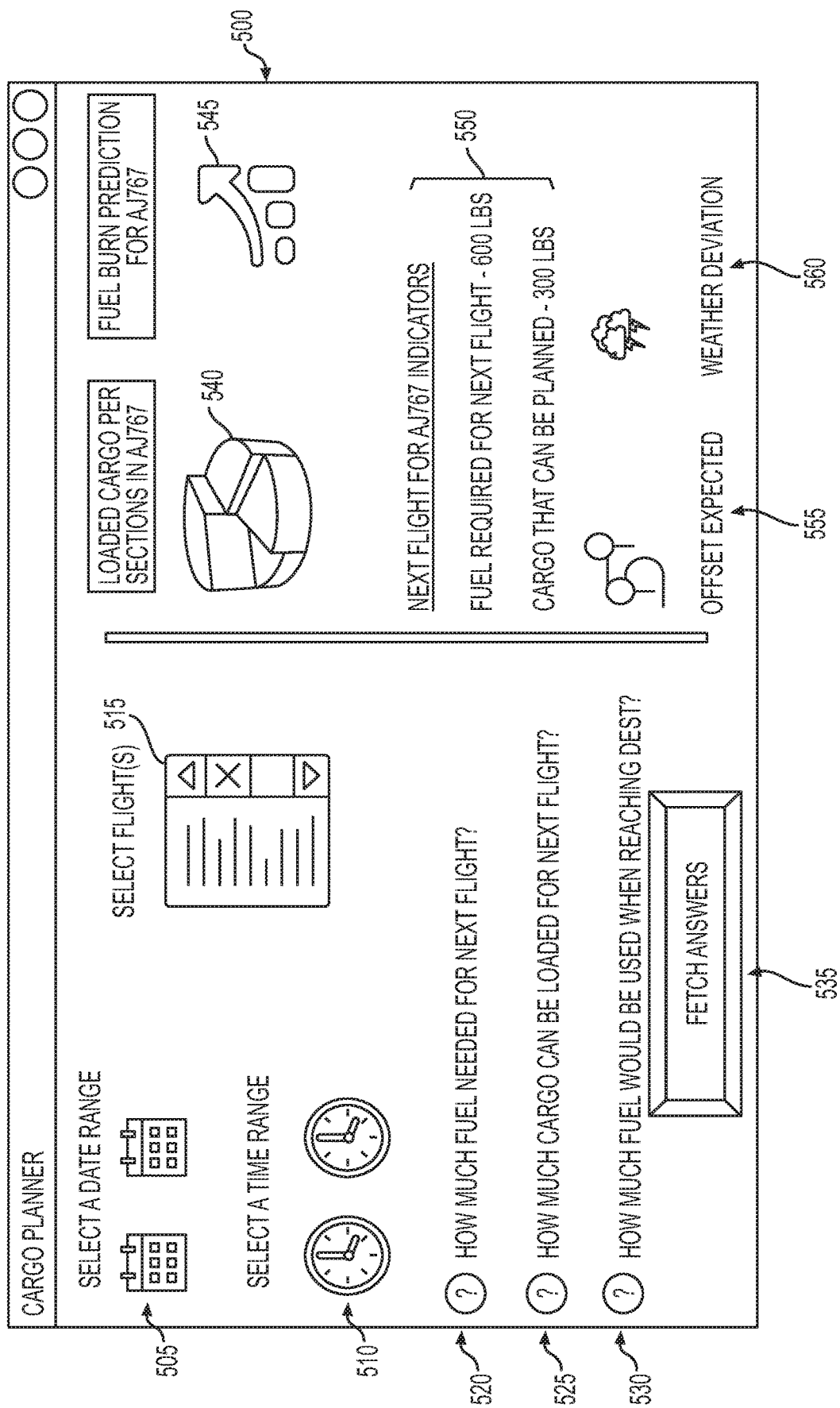
FIG. 5 depicts an exemplary user interface for the Connected FMS Cargo and Fuel Services system, according to one aspect of the present disclosure.

FIG. 5 depicts one of a plurality of exemplary user interfaces that may be used by the fleet aircraft operators or airline personnel to utilize the techniques disclosed herein. User interface 500 may include a date selector 505, a time selector 510, a flight selector 515, query buttons 520, 525, 530, and 535, cargo placement icon 540, fuel burn prediction icon 545, a next flight indicator section 550, an offset expected icon 555, and a weather deviation icon 560.

According to FIG. 5, a fleet aircraft operator or airline personnel may select a data range using the data selector 505, a time range using the time selector 510, and one or multiple specific flights using the flight selector 515. Then the operator or personnel may select cargo placement icon 540 to view or input the current cargo loaded in the aircraft, select the fuel burn prediction icon 545 to view or input the fuel usage prediction of the aircraft, select the offset expected icon 555 to view or input any diversion from the aircraft's original flight path, and/or select the weather deviation icon 560 to view or input any dynamic weather issues that could affect the aircraft's flight path.

Then the fleet aircraft operator or airline personnel may select any one of the query buttons 520, 525, and 530 depending on the information that is needed. For example, if the operator or personnel wants to know how much fuel is need for the next flight, the operator or personnel may select the query button 520. If the operator or personnel wants to know how much cargo can be loaded for the next flight, the operator or personnel may select the query button 525. If the operator or personnel wants to know how much fuel would be used when the aircraft is reaching destination, the operator or personnel may select the query button 530. After selecting one or a combination of the query buttons, the operator or personnel may then select the query button 535 to fetch the answers for each of the queries and the answers would be displayed in the next flight indicator section 550. For example, given the parameters selected by the operator or personnel, the fuel required for the aircraft for next flight is 600 lbs and the cargo that can be planned for the aircraft is 300 lbs.

Although FIG. 5 shows an exemplary user interface, in some implementations, interface 500 may include additional user interface elements, fewer user interface elements, different user interface elements, or differently arranged user interface elements than those depicted in FIG. 5.

Figure 6:
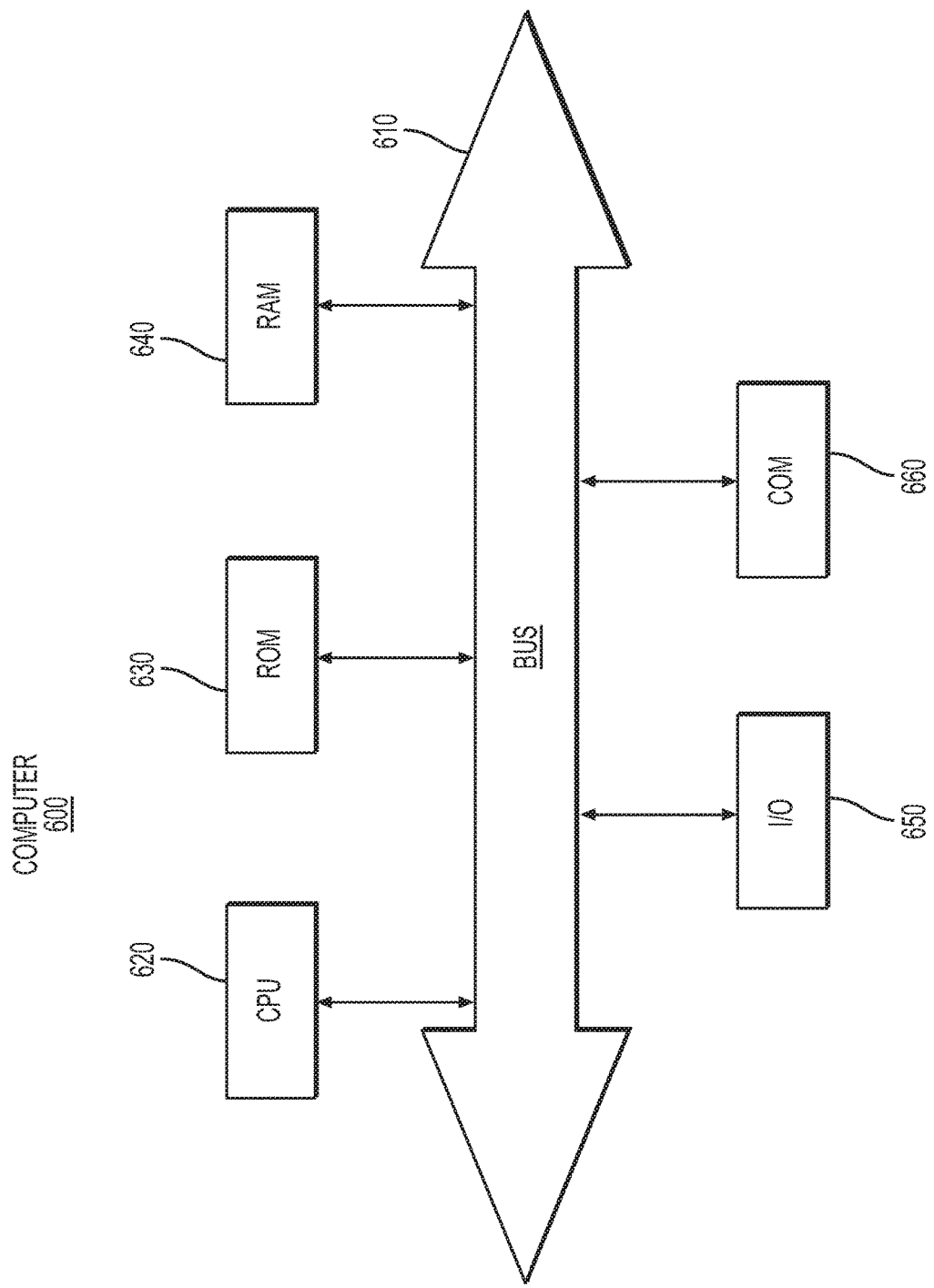
FIG. 6 depicts an exemplary computer device or system, in which embodiments of the present disclosure, or portions thereof, may be implemented.

FIG. 6 depicts a high-level functional block diagram of an exemplary computer device or system, in which embodiments of the present disclosure, or portions thereof, may be implemented, e.g., as computer-readable code. In some implementations, the onboard FMS 161, the EFB 161*c* (depicted in FIG. 1) may be consistent with or similar to device 600. Additionally, or alternatively, the AOC center systems 230, the cloud 205 may each be consistent with or similar to device 600. Additionally, each of the exemplary computer servers, databases, user interfaces, modules, and methods described above with respect to FIGS. 1-5 may be implemented in device 600 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-5.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-5, may be implemented using device 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 6, device 600 may include a central processing unit (CPU) 620. CPU 620 may be any type of processor device including, for example, any type of microprocessor device. As will be appreciated by persons skilled in the relevant art, CPU 620 also may be a single processor in a multi-core/multiprocessor system, such system operating alone, or in a cluster of computing devices operating in a cluster or server farm. CPU 620 may be connected to a data communication infrastructure 610, for example, a bus, message queue, network, or multi-core message-passing scheme.

Device 600 also may include a main memory 640, for example, random access memory (RAM), and also may include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 600.

Device 600 also may include a communications interface ("COM") 660. Communications interface 660 allows software and data to be transferred between device 600 and external devices. Communications interface 660 may include a modem, a network interface (such as an Ethernet card), a communications port, a PCMCIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of device 600, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for fleet based aircraft flight planning using real-time aircraft intelligence, the computer-implemented method comprising:
   receiving, by a processor, real-time flight data associated with at least one flight parameters of an aircraft;
   receiving, by the processor, real-time weather data along a flight path of the aircraft;
   receiving, by the processor, real-time planning data of the aircraft, the real-time planning data including at least one of a traffic diversion status, minimum equipment list constraints, a cargo weight, and an estimate time of arrival of the aircraft at a stopover airport;
   calculating, by a simulation engine executed by the processor, flight modification parameters using the real-time flight data, the real-time weather data, and the real-time planning data; and
   transmitting, by the processor, the flight modification parameters to a flight management system of the aircraft, wherein the at least one flight parameters of the aircraft is adjusted based on the flight modification parameters.

2. The computer-implemented method of claim 1, wherein the real-time flight data comprise at least one of an onboard aircraft fuel quantity, an onboard aircraft weight, a predicted aircraft fuel level at landing, a predicted aircraft weight at landing, an aircraft fuel flow status, and a change in aircraft center of gravity.

3. The computer-implemented method of claim 1, wherein the flight modification parameters comprise at least one of an increase in speed, a decrease in speed, an increase in altitude, and a decrease in altitude.

4. The computer-implemented method of claim 1, wherein the flight management system of the aircraft is at least one of an onboard flight management system located onboard the aircraft or a remote flight management system located remotely from the aircraft, and the real-time flight data is received from at least one of the onboard flight management system onboard or the remote flight management system.

5. The computer-implemented method of claim 1, wherein calculating the flight modification parameters comprises calculating loading positions of cargo inside cargo compartments of the aircraft.

6. The computer-implemented method of claim 1, further comprising:
   calculating, by the processor, a center of gravity of the aircraft using the real-time flight data and the real-time planning data.

7. A computer-implemented system for fleet based aircraft flight planning using real-time aircraft intelligence, the computer-implemented system comprising:
   at least one memory storing processor-readable instructions; and
   at least one processor configured to access the at least one memory and execute the processor-readable instructions to perform operations, the operations including:
      receiving real-time flight data associated with at least one flight parameters of an aircraft;
      receiving real-time weather data along a flight path of the aircraft;
      receiving real-time planning data of the aircraft, the real-time planning data including at least one of a traffic diversion status, minimum equipment list constraints, a cargo weight, and an estimate time of arrival of the aircraft at a stopover airport;
      calculating flight modification parameters using the real-time flight data, the real-time weather data, and the real-time planning data; and
      transmitting the flight modification parameters to a flight management system of the aircraft, wherein the at least one flight parameters of the aircraft is adjusted based on the flight modification parameters.

8. The computer-implemented system of claim 7, wherein the real-time flight data comprise at least one of an onboard aircraft fuel quantity, an onboard aircraft weight, a predicted aircraft fuel level at landing, a predicted aircraft weight at landing, an aircraft fuel flow status, and a change in aircraft center of gravity.

9. The computer-implemented system of claim 7, wherein the flight modification parameters comprise at least one of an increase in speed, a decrease in speed, an increase in altitude, and a decrease in altitude.

10. The computer-implemented system of claim 7, wherein the flight management system of the aircraft is at least one of an onboard flight management system located onboard the aircraft or a remote flight management system located remotely from the aircraft, and the real-time flight data is received from at least one of the onboard flight management system or the remote flight management system.

11. The computer-implemented system of claim 7, wherein calculating the flight modification parameters includes calculating loading positions of cargo inside cargo compartments of the aircraft.

12. The computer-implemented system of claim 7, wherein the operations further include:
    calculating a center of gravity of the aircraft using the real-time flight data and the real-time planning data.

13. A non-transitory computer-readable medium for fleet based aircraft flight planning using real-time intelligence, the non-transitory computer-readable medium storing instructions that, when executed by at least one processor, cause the at least one processor to perform operations, the operations comprising:
    receiving real-time flight data associated with at least one flight parameters of an aircraft;
    receiving real-time weather data along a flight path of the aircraft;
    receiving real-time planning data of the aircraft, the real-time planning data including at least one of a traffic diversion status, minimum equipment list constraints, a cargo weight, and an estimate time of arrival of the aircraft at a stopover airport;
    calculating flight modification parameters using the real-time flight data, the real-time weather data, and the real-time planning data; and
    transmitting the flight modification parameters to a flight management system of the aircraft, wherein the at least one flight parameters of the aircraft is adjusted based on the flight modification parameters.

14. The non-transitory computer-readable medium of claim 13, wherein the real-time flight data comprise at least one of an onboard aircraft fuel quantity, an onboard aircraft weight, a predicted aircraft fuel level at landing, a predicted aircraft weight at landing, an aircraft fuel flow status, and a change in aircraft center of gravity.

15. The non-transitory computer-readable medium of claim 13, wherein the flight modification parameters comprise at least one of an increase in speed, a decrease in speed, an increase in altitude, and a decrease in altitude.

16. The non-transitory computer-readable medium of claim 13, wherein the flight management system of the aircraft is at least one of an onboard flight management system located onboard the aircraft or a remote flight management system located remotely from the aircraft, and the real-time flight data is received from at least one of the onboard flight management system or the remote flight management system.

17. The non-transitory computer-readable medium of claim 13, the operations further includes calculating a center of gravity of the aircraft using the real-time flight data and the real-time planning data.

* * * * *